(12) United States Patent
Callier et al.

(10) Patent No.: US 10,890,774 B2
(45) Date of Patent: Jan. 12, 2021

(54) METHOD FOR PROVIDING A HEAD MOUNTED OPTICAL SYSTEM

(71) Applicant: Essilor International, Charenton-le-Pont (FR)

(72) Inventors: Benoit Callier, Charenton-le-Pont (FR); Loïc Quere, Charenton-le-Pont (FR); Marc Reignault, Charenton-le-Pont (FR); Sira Uhalte Nogues, Charenton-le-Pont (FR); Mathieu Meynen, Charenton-le-Pont (FR); Denis Cohen Tannoudji, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 336 days.

(21) Appl. No.: 14/786,257

(22) PCT Filed: May 2, 2014

(86) PCT No.: PCT/EP2014/058977
§ 371 (c)(1),
(2) Date: Oct. 22, 2015

(87) PCT Pub. No.: WO2014/177684
PCT Pub. Date: Nov. 6, 2014

(65) Prior Publication Data
US 2016/0062124 A1 Mar. 3, 2016

(30) Foreign Application Priority Data

May 2, 2013 (EP) .................................. 13305579
Oct. 22, 2013 (EP) .................................. 13306457

(51) Int. Cl.
*G02B 27/01* (2006.01)
*G02C 7/00* (2006.01)
(Continued)

(52) U.S. Cl.
CPC ..... *G02B 27/0176* (2013.01); *G02B 27/0172* (2013.01); *G02C 7/00* (2013.01);
(Continued)

(58) Field of Classification Search
CPC ...... G02C 7/101; G02C 2202/16; G02C 7/04; G02C 7/08; G02C 7/102; G02C 7/02;
(Continued)

(56) References Cited

U.S. PATENT DOCUMENTS 5,886,822 A * 3/1999 Spitzer ............... G02B 27/0172
359/630
2004/0084790 A1* 5/2004 Blum ............... B29D 11/00028
351/159.03

(Continued)

FOREIGN PATENT DOCUMENTS

EP 0 817 031 A2 1/1998
EP 2 963 482 A1 1/2016
(Continued)

OTHER PUBLICATIONS

Japanese Office Action dated Feb. 20, 2018 in Japanese Patent Application No. 2016-511089, citing documents AO through AT therein, 7 pages.
(Continued)

*Primary Examiner* — William R Alexander
*Assistant Examiner* — Alberto J Betancourt
(74) *Attorney, Agent, or Firm* — Oblon, McClelland, Maier & Neustadt, L.L.P.

(57) ABSTRACT

Method for providing a head mounted optical system, the method comprising: an optical system providing step (S1), during which an optical system with an active function is provided and, an encapsulating step (S8), during which the optical system is at least partly encapsulated in a transparent capsule by stacking in close contact the optical system with (Continued)

at least one substrate of the transparent capsule and made integral with an adhesive.

23 Claims, 6 Drawing Sheets

(51) Int. Cl.
*G02C 7/02* (2006.01)
*G02C 11/00* (2006.01)
*B29D 11/00* (2006.01)
*G02C 13/00* (2006.01)
*G02C 9/00* (2006.01)

(52) U.S. Cl.
CPC ............... *G02C 7/027* (2013.01); *G02C 9/00* (2013.01); *G02C 11/00* (2013.01); *G02C 13/00* (2013.01); *B29D 11/00807* (2013.01); *G02B 2027/0178* (2013.01)

(58) Field of Classification Search
CPC ........ G02C 7/061; G02C 7/085; G02C 7/086; G02C 7/10; G02C 7/022; G02C 11/10; G02C 2202/04; G02C 2202/14
USPC ................ 264/1.7, 1.32, 1.1, 1.31, 2.7, 338; 349/13, 15, 158, 201; 351/159.39, 351/159.03, 159.56, 159.74, 159.02, 351/159.68, 159.73, 159.75, 49, 159.4, 351/159.41, 159.42, 159.62, 41, 159.22, 351/159.27, 159.44, 159.46, 159.49, 351/159.79, 211, 216, 222, 233, 239; 359/642, 319, 19, 666, 487.02, 619, 630; 372/101; 623/6.27, 6.3
See application file for complete search history.

(56) References Cited

U.S. PATENT DOCUMENTS

| | | | | |
|---|---|---|---|---|
| 2006/0092340 A1* | 5/2006 | Blum | ......................... | G02C 7/08 349/13 |
| 2007/0008624 A1 | 1/2007 | Hirayama | | |
| 2008/0198325 A1* | 8/2008 | Bonnin | ..................... | G02C 7/06 351/159.42 |
| 2008/0273246 A1 | 11/2008 | Moliton et al. | | |
| 2009/0103044 A1* | 4/2009 | Duston | .................... | G02C 5/02 351/159.01 |
| 2010/0033830 A1* | 2/2010 | Yung | ........................ | G02B 3/00 359/630 |
| 2010/0142061 A1* | 6/2010 | Choi | ..................... | B29C 33/305 359/793 |
| 2010/0261313 A1* | 10/2010 | Toh | ........................ | H01L 21/561 438/109 |
| 2012/0057122 A1 | 3/2012 | Guillot et al. | | |
| 2012/0229367 A1* | 9/2012 | Magyari | ............ | G02B 27/0172 345/8 |
| 2013/0070199 A1* | 3/2013 | Blum | ....................... | G02C 7/06 351/159.4 |
| 2013/0142948 A1* | 6/2013 | Ohta | ..................... | G05B 15/00 427/164 |
| 2013/0229619 A1* | 9/2013 | Becken | .................... | G02C 7/02 351/159.77 |
| 2013/0250191 A1* | 9/2013 | Blum | ..................... | G02C 7/022 349/13 |

FOREIGN PATENT DOCUMENTS

| | | |
|---|---|---|
| FR | 2 866 442 | 8/2005 |
| JP | 63-276542 A | 11/1988 |
| JP | H10-301055 A | 11/1998 |
| JP | 2005-234309 A | 9/2005 |
| JP | 2005-536782 A | 12/2005 |
| JP | 2008-506980 A | 3/2008 |
| JP | 2009-075195 A | 4/2009 |
| JP | 2010-210735 A | 9/2010 |
| JP | 2012-510075 A | 4/2012 |
| WO | WO 2004/019078 A2 | 3/2004 |
| WO | WO 2005/088384 A1 | 9/2005 |
| WO | WO 2009/037932 A1 | 3/2009 |
| WO | WO 2011/062951 | 5/2011 |
| WO | WO 2011/095379 | 8/2011 |
| WO | WO 2012/082807 A2 | 6/2012 |
| WO | WO 2012/088478 A1 | 6/2012 |

OTHER PUBLICATIONS

European Office Action dated Jan. 20, 2020, in Patent Application No. 15 843 095.9, citing documents AO-AP therein, 5 pages.
Japanese Office Action dated Sep. 3, 2019, issued in Japanese Patent Application No. 2016-511089 (with English translation).

* cited by examiner

METHOD FOR PROVIDING A HEAD MOUNTED OPTICAL SYSTEM

RELATED APPLICATIONS

This is a U.S. national stage application under 35 USC § 371 of International Application No. PCT/EP2014/058977, filed on May 2, 2014. This application claims the priority of European application nos. 13305579.8 filed May 2, 2013 and 13306457.6 filed Oct. 22, 2013, the entire contents of all of which are hereby incorporated by reference.

FIELD OF THE INVENTION

The invention relates to a method for providing a head mounted optical system adapted to a wearer.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

A head-mounted system is an electro-optical device worn on the head by a wearer. Usually such system is electronically controlled so as to switch between different stages or to display information to the wearer. A head mounted system usually presents like a spectacle frame with electronically controlled spectacle lenses.

The present invention is concerned with head-mounted system used according to various usage pattern such as non immersive head-mounted system that allow the wearer to interact with their environment while using the head-mounted system or immersive head-mounted system that cuts off the field of outside view.

More particularly, the present invention is concerned with head-mounted system comprise see-around or see-through mechanism.

Head-mounted see-through display systems are capable of superimposing information, for example computer generated information, over the real-world view. Such Head-mounted see-through display systems are used in particular for realizing augmented reality.

Since, the wearer sees the real-world through the head mounted see-through system there is a need to customize such system to the wearer's viewing ability. Then the wearer needs corrective ophthalmic lenses to see the real world correctly, the head mounted see-through system should be adapted to such requirements.

Therefore, there is a need for a method of providing a head-mounted see-through system adapted to a wearer, in particular to a wearer's prescription.

Yet, providing a head-mounted see-through system adapted to a wearer is susceptible to affect the unit production cost.

SUMMARY OF THE INVENTION

Therefore, it is an object of the present invention to provide an easy method combining the need to supply a head mounted system adapted to a wearer's vision, and the industrial mass-production of head mounted systems.

To this end, one aspect of the invention is directed to a method for providing a head mounted optical system adapted to a wearer, the method comprising:

an optical system providing step, during which an optical system is provided, a wearer data providing step, during which wearer data comprising at least the wearer's prescription is provided, optionally, an encapsulating step, during which the optical system is at least partly encapsulated in a transparent capsule, a customizing step, during which, respectively, at least one face of the optical system or one face of the transparent capsule is customized according to the wearer data.

Advantageously, by customizing the capsule, the method according to an embodiment of the invention allows providing a customized head mounted system while using generic electro optical system. Therefore, according to the invention, an electro-optical system provider may provide a generic electro-optical system, i.e. not adapted to the specific need of each individual wearer, and a lens provider may encapsulate the generic electro-optical system in a transparent capsule customized for the specific need of each wearer as for ophthalmic lenses.

Advantageously, the method according to an embodiment of the invention allows decoupling the electro-optical elements mounting and the vision-correction customization, simplifying the production lines of head mounted see-through electro-optical systems adapted to a wearer.

Advantageously, the method according to an embodiment of the invention allows providing a customized head mounted system by delaying the customization of the head mounted system in the production process.

According to further embodiments which can be considered alone or in combination:

the method further comprises a mounting step, during which the encapsulated optical system or the optical system is mounted in a spectacle frame; and/or the customizing step is implemented after the mounting step; and/or the customizing step is implemented prior to the encapsulating step; and/or the customizing step is implemented after the encapsulating step; and/or the customizing step is implemented prior to the mounting step; and/or the method further comprises:
  an optical system data providing step, during which optical system data representing at least the shape of the faces of the optical system prior to the encapsulation step and the optical index of the optical system is provided,
  a capsule data providing step, during which capsule data representing at least the optical index of the transparent capsule is provided,
  an optical function determining step, during which the optical function to be provided to the wearer according to the wearer's data and the system's data is determined, and
  a surface data determining step, during which surface data representing the surface of at least one face to be customized of the capsule is determined according to the optical function and the capsule data; and/or the method further comprises:
  an optical system data providing step, during which optical system data representing at least the shape of the faces of the optical system prior to the encapsulation step and the optical index of the optical system is provided, a capsule data providing step, during which capsule data representing at least the optical index of the capsule is provided, an optical function determining step, during which the optical function to be provided to the wearer according to the wearer's data and the optical system's data is determined, and a index map determining step which index map representing the index variation of at least one face to be customized of the capsule is determined according to the optical function and the capsule data; and/or the method further comprises:

an optical system data providing step, during which optical system data representing at least the shape of the faces of the optical system prior to the encapsulation step and the optical index of the optical system is provided, a capsule data providing step, during which capsule data representing at least the shape of the faces of the capsule prior to the customizing step and the optical index of the capsule is provided, an optical function determining step, during which the optical function to be provided to the wearer according to the wearer's data and the optical system's data is determined, and a diffractive network map determining step which diffractive network map representing the diffractive variation of at least one face to be customized of the capsule is determined according to the optical function and the capsule data; and/or during the optical function determining step, the optical function to be provided to the wearer is determined according to the wearer's data, the optical system's data and the capsule's data; and/or during the customizing step the face to be customized of the capsule is machined according to the surface data; and/or during the customizing step an optical patch is added to the face to be customized of the capsule or of the optical system; and/or during the customizing step a discrete optical function is adding to the face to be customized of the capsule or of the optical system; and/or the head mounted optical system is a head mounted see-through display system; and/or the method further comprises a display mounting step during which a display is coupled to an optical insert, wherein the display mounting step is implemented prior to the encapsulating step; and/or during the encapsulating step an optical insert is placed is a slot of the capsule by being inserted laterally in the slot.

According to a further aspect, the invention relates to a computer program product comprising one or more stored sequences of instructions that are accessible to a processor and which, when executed by the processor, causes the processor to carry out the step of the method according to an embodiment of the invention.

Another aspect of the invention relates to a computer readable medium carrying one or more sequences of instructions of the computer program product according to an embodiment of the invention.

Furthermore, the invention relates to a program which makes a computer execute the method according to an embodiment of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequences of instructions and to carry out at least one of the step of the method according to an embodiment of the invention.

Another aspect of the invention relates to a method for providing a head mounted electro-optical system, the method comprising:

an electro-optical system providing step, during which a electro-optical system is provided and, an encapsulating step, during which the electro-optical system is at least partly encapsulated in a transparent capsule by stacking in close contact the electro-optical system with at least one substrate of the transparent capsule and made integral with an adhesive.

According to further embodiments which can be considered alone or in combination:

the encapsulating step comprises the following sub steps:

an adhesive depositing step during which at least one drop of adhesive on a face of the transparent capsule and/or or one of the face of the optical element is deposited;

a force application step during which a force is applied to the transparent capsule and/or the optical element to form a layer of adhesive between the face of the transparent capsule and the face of the optical element facing; and a bonding step during which the optical element and the transparent capsule are made integral with the adhesive.

the encapsulating step comprises the following sub steps:

an adhesive depositing step during which at least a film of adhesive on a face of the transparent capsule and/or or one of the face of the optical element is deposited;

a force application step during which a force is applied to the transparent capsule and/or the optical element to form a layer of adhesive between the face of the transparent capsule and the face of the optical element facing; and a bonding step during which the optical element and the transparent capsule are made integral with the adhesive.

the encapsulating step comprises the following sub steps:

an adhesive depositing step during which at least at least one drop of adhesive on a face of the transparent capsule and/or or one of the face of the optical element is deposited with a spin coating method;

a force application step during which a force is applied to the transparent capsule and/or the optical element to form a layer of adhesive between the face of the transparent capsule and the face of the optical element facing; and a bonding step during which the optical element and the transparent capsule are made integral with the adhesive.

the force applied is defined by the application of the weight force of the transparent capsule or the optical element respectively on the optical element or the transparent capsule.

the force applied is defined by the application of a pressure on the optical element and/or the transparent capsule.

the pressure is applied using:

at least a movable deformable pad or at least a deformable membrane with fluid or solid or, vacuum pressure.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include one or more apparatus for performing the operations herein. Such apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EE-PROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

Figure 1A:
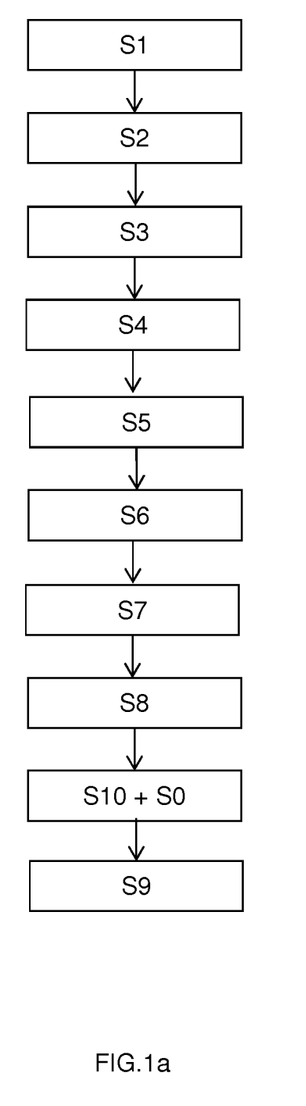
FIGS. 1a to 1i are flowcharts representing the steps of a method according to several embodiments of the invention.
Figure 1B:
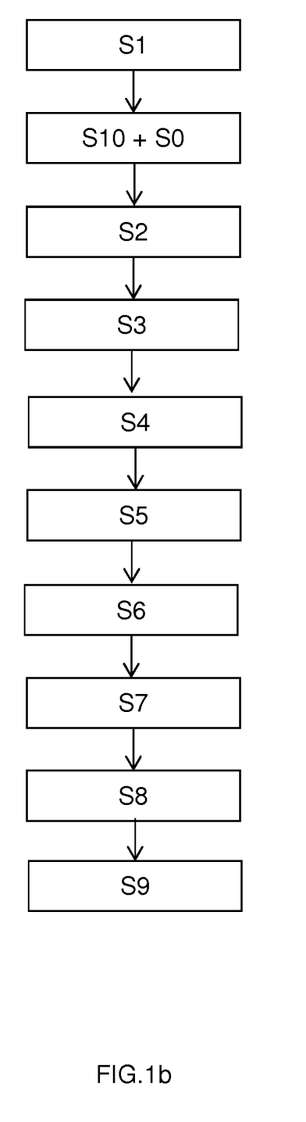
Figure 1C:
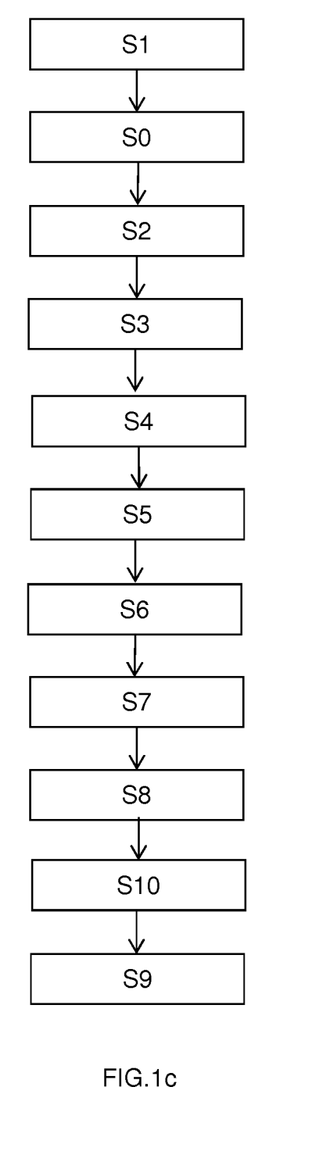

According to an embodiment of the invention illustrated on FIG. 1a, the method for providing a head mounted see-through system adapted to a wearer, comprises:
a see-through electro-optical system providing step S1,
a wearer data providing step S2,
an encapsulating step S8 and
a customizing step S9.

During the see-through electro-optical system providing step S1, a see-through electro-optical system is provided.

In the sense of the invention, an "electro-optical system" is a system with a switchable function (active function) that enables at least part of the active function of the system to be controlled by means of an electrical stimulus.

The active function of the lens may be of various types.

It may be a function of reinforcing contrast by adapting the tint of the lens, e.g. as described in U.S. Pat. No. 6,250,759. It may be also be a function of reinforcing contrast by filtering light with a determined direction of polarization.

For example the electro-optical means may comprise a system having a variable light transmission. Such system may be of the electrochromic type. In a preferred manner, it is a system with little electricity consumption, such as a system based on liquid crystals or a system of electrophoretic type. For such systems, the electrical stimulus that leads to a variation in light transmission is an electric field, i.e. it corresponds to an electrical voltage being applied across two input terminals of the system. Electricity consumption is low, and is compatible with an electrical power supply of small dimensions.

In another embodiment, the active function of the lens may be a diffractive or holographic optical element.

In another embodiment, the active function of the lens may be brought in pixelized form.

For example, the optical function may be of the Fresnel type or of the Alvarez and Lohmann refractive type.

The see-through electro-optical system may also be a display system arranged to display information over the real world view. For example, the display system is arranged to display computer generated information over the real world view, thus allowing realizing augmented reality device.

With such augmented reality device the viewer's image of the world is augmented with overlaying information.

Figure 2:
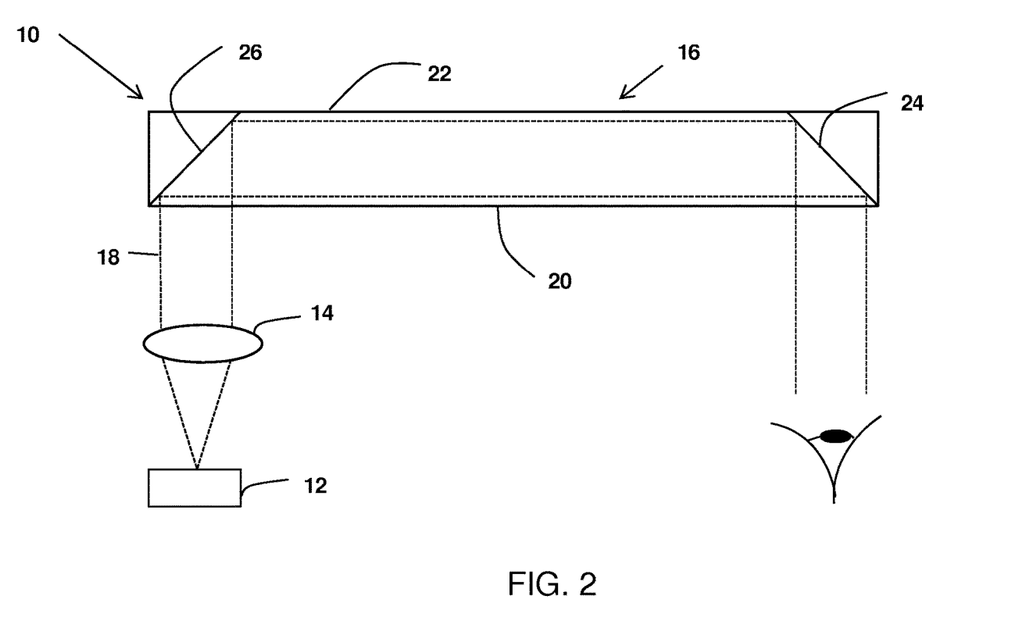
FIG. 2 is a schematic view of a see-through electro-optical system.

An example of see-through display system is illustrated in FIG. 2. Such see-through display system 10 comprises a display source 12, a collimating device 14, and an optical insert 16 constituted by a light-guide optical element 16 (LOE).

Such see-through display system 10 allows a two-dimensional image source to be imaged to infinity or not and reflected into the eye of the wearer.

The display source 12 can be emissive or not emissive.

It can be directly obtained from either a spatial light modulator (SLM) such as a cathode ray tube (CRT), a liquid crystal display (LCD), an organic light emitting diode array (OLED), a scanning source, liquid crystal on silicon (LCoS) or similar devices, or indirectly, by means of a relay lens or an optical fiber bundle. The display source 12 comprises an array of elements (pixels) imaged to infinity by the collimating device 14, for example a collimating lens.

The light-guide optical element 16 typically includes at least two major surfaces 20 and 22 and edges, at least one partially reflecting surface 24 and an optical element 26 for coupling light thereinto. The output waves 18 from the collimating device 14 enter the light-guide optical element 16 through its lower surface 20. The incoming waves (towards the light-guide optical element 16) are reflected from the surface 26 and trapped in the light-guide optical element 16.

In an embodiment, the electro-optical system may comprise a plane light-guide optical element 16 with at least two planes major surfaces 20 and 22. For example, such a light guide optical element 16 may be one of Lumus Company.

In an alternative embodiment, the electro-optical system may comprise a curved light-guide optical element 16.

An example of elliptic diopter with semi-reflective elliptic surface is illustrated in FR2866123.

The collimating device 14 can easily be integrated into a single mechanical module which may be assembled independently of the light-guide optical element 16, with fairly relaxed mechanical tolerances.

In this embodiment, the method comprises a display mounting step S0 during which the display source 12 and the collimating device 14 are coupled to the optical insert 16.

During the wearer data providing step S2, wearer data comprising at least the wearer's prescription is provided. The wearer data may comprise further information concerning for example the type, shape, dimension of spectacle frame the wearer has selected and/or the wearer interpupillary distance and/or wearing condition parameters or any information concerning the wearer that may be useful for the lens provider.

The wearer's prescription is a set of optical characteristics of optical power, of astigmatism and, where relevant, of addition, determined by an ophthalmologist in order to correct the vision defects of the wearer, for example by means of a lens positioned in front of his eye. For example, the prescription for a progressive addition lens comprises values of optical power and of astigmatism at the distance-vision point and, where appropriate, an addition value.

For example, the wearer's prescription may be the prescription of an emmetropic wearer.

During the encapsulating step S8, the see-through electro-optical system 10 is at least partly encapsulated in a transparent capsule 30.

More precisely, as illustrated in FIGS. 2 to 6, the optical insert 16 is partly encapsulated in the transparent capsule 30 on one of his face or fully encapsulated in the transparent capsule 30.

Figure 4:
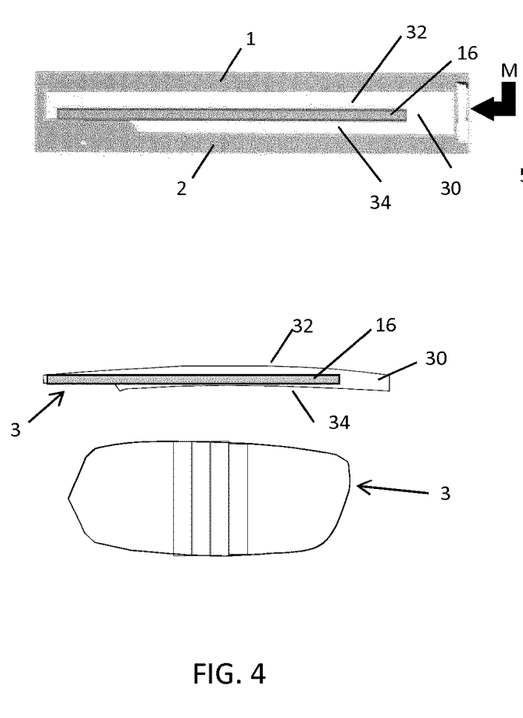
FIG. 4 is a schematic view of a first encapsulating step of the method according to an embodiment of the invention.
Figure 5A:
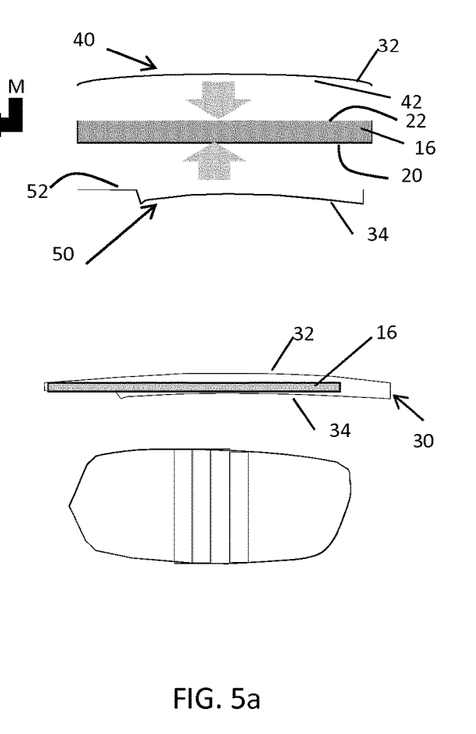
FIG. 5a is a schematic view of a second encapsulating step of the method according to an embodiment of the invention.
Figure 5B:
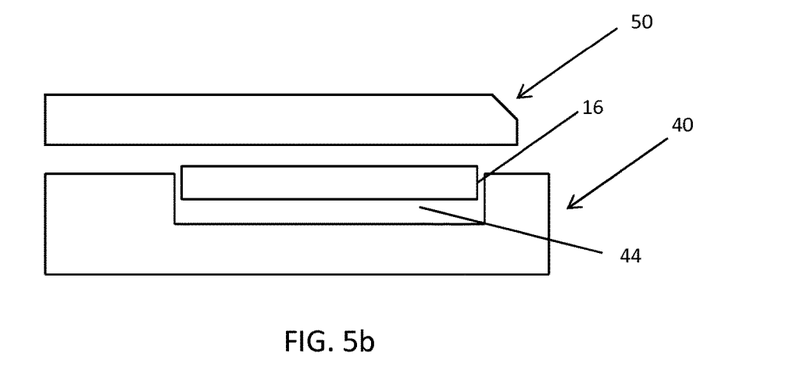
FIG. 5b is a schematic view of a third encapsulating step of the method according to an embodiment of the invention.
Figure 6:
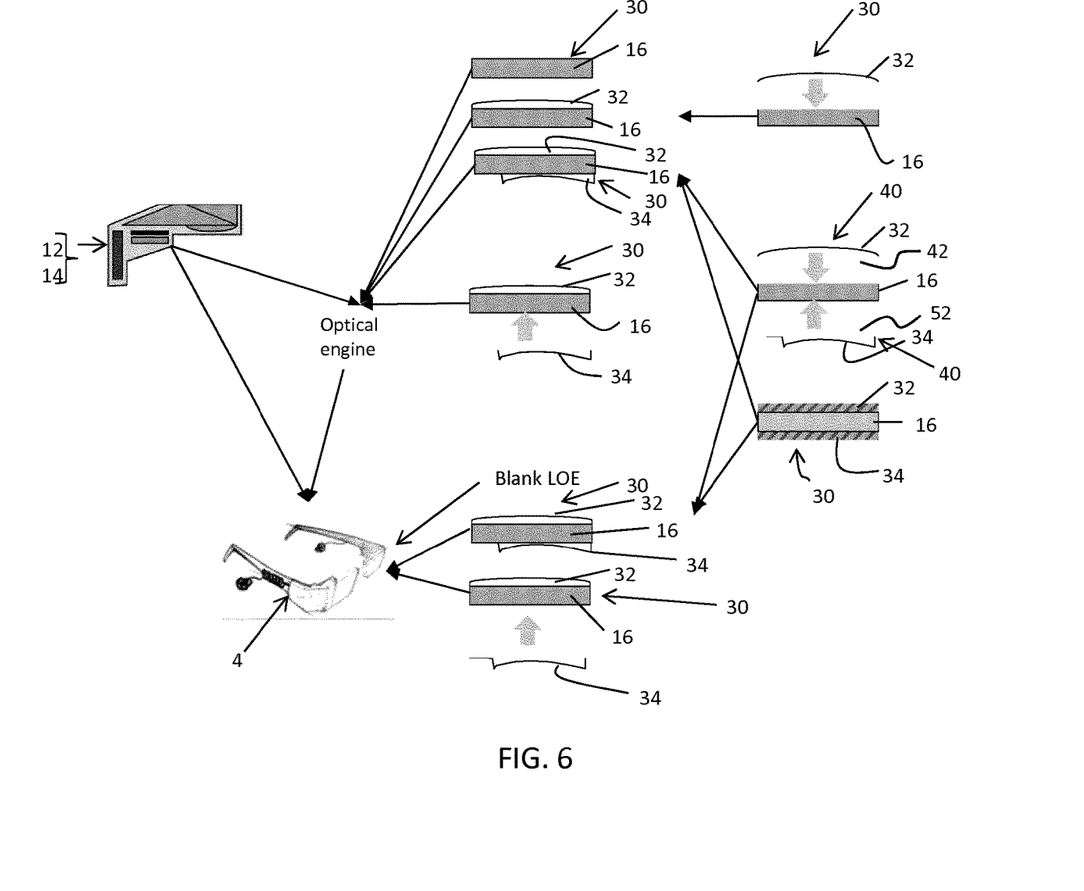
FIG. 6 is a schematic view of various LOE encapsulation embodiments of a method according to an embodiment of the invention.

According to embodiments illustrated on FIGS. 4 to 6, a transparent capsule 30 is provided.

Such transparent capsule 30 may have a first optical face 32 and/or a second optical face 34.

Figure 3:
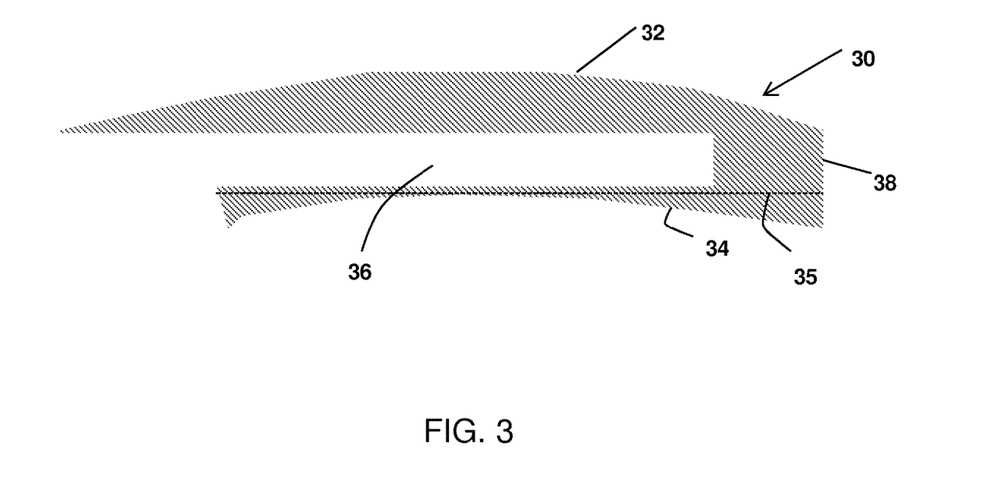
FIG. 3 is a schematic view of transparent capsule.

According to an embodiment illustrated on FIG. 3, the transparent capsule 30 has a first optical face 32 and a second optical face 34 separated by a slot 36 and connected by an external partly periphery surface 38.

In the example represented on FIGS. 3 to 6, the first optical face 32 corresponds to the front face of the transparent capsule 30. In use of the resulting head mounted see-through electro-optical system, the front face 32 is disposed nearest the object being viewed.

Although the first optical face 32 is represented as convex and the second optical face 34 is represented as concave in FIGS. 3 to 6, it will be appreciated that the first face 32, respectively the second face 34, could equally well be concave, respectively convex, or any other curved, progressive or complex surfaces.

According to the embodiment illustrated on FIG. 3, the slot 36 is arranged so as to receive at least part of the see-through electro-optical system. Preferably, the slot 36 is arranged so as to receive either the light-guide optical element 16 in the case of a display system or the active material layer in the case of an optical function adapting system.

In a first preferred implementation, the optical insert 16 is placed is said slot 36 by being inserted laterally in the slot 36.

In an embodiment, the capsule is made by casting, molding, in particular molding by injection, or machining and the first face 32 and the second face 34 are made so as to form the two faces of the lens and the cavity defining the slot 36.

Advantageously and optionally, the capsule 30 may be treated by surfacing and polishing and cut by trimming to the form of the finished lens ready for placing on a spectacles frame, prior to the encapsulating step S8.

Advantageously, the optical insert is not damaged during the cutting step of the capsule 30.

In a second preferred implementation represented on FIGS. 5 and 6, the optical insert 16 (edged or not) is stacked in close contact between two substrates assembled to form the first face 32 and the second face 34 of the transparent capsule 30 and made integral with an adhesive.

As illustrated in FIGS. 5 and 6, the first substrate 40 may be a wafer with a face corresponding to the first optical face 32 of the transparent capsule 30 and an opposite internal face 42 facing the LOE 16.

The second substrate 50 may be a wafer with a face corresponding to the second optical face 34 of the transparent capsule 30 and an opposite internal face 52 facing the LOE.

Although the first optical face 32 is represented as convex and the second optical face 34 is represented as concave in FIGS. 3 to 6, it will be appreciated that the first face 32, respectively the second face 34, could equally well be concave, respectively convex, or any other curved, progressive or complex surfaces.

In this implementation, the optical insert 16 (edged or not) is stacked in close contact with the first substrate 40 and, in particular, the internal face 42 of the first substrate 40 and made integral with an adhesive (non illustrated) between the first substrate 40 and the LOE 16.

For the second substrate 50, the process is the same.

In an alternative preferred implementation represented on FIG. 6, the optical insert 16 is stacked in close contact with at least one substrate of the transparent capsule 30 and made integral with an adhesive.

Prior to the stacking step, at least one substrate is made by casting, molded, in particular molded by injection or machined so as to form the respective face of the lens.

As represented on FIG. 5b, the first substrate 40 may comprise a receiving area 44 of the shape and depth of the LOE 16. Once the LOE 16 is placed in the receiving area 44 of the first substrate 40, the second substrate is bound to the first substrate thus encapsulating the LOE 16. The bonding may be obtained by using an adhesive between the first and second substrates.

As detailed below, once the first and second substrates are bounded with the LOE between them, the external surfaces of the first and second substrate may be surfaced according to surfacing data determined based on the wearer data.

Advantageously and optionally, the substrates may be treated by surfacing and polishing and cut by trimming to the form of the finished lens ready for placing on a spectacles frame, prior to the encapsulating step.

Numerous methods may be proposed to encapsulate the electro-optical system (such as one with a light guide optical element 16) in a transparent capsule 30 by a bonding method and are disclosed below.

The bonding methods of the invention are particularly advantageous as they allow the transparent capsule 30 to be applied to a surface of the light guide optical element 16 in a simple manner.

In preliminary steps already mentioned, as illustrated in FIGS. 5a, 5b and 6, a method for encapsulating by bonding an electro optical system comprises a step of providing a transparent capsule 30 with at least one substrate 40, 50 to form the first face 32 and/or the second face 34 of the transparent capsule 30.

Such substrates are made by casting, molding, in particular molding by injection, or machining with a point to point digital surfacing technology or free form processing and the first face 32 and the second face 34 are made so as to form the two faces of the lens.

In an embodiment, the substrates of the capsule 30 are in organic material.

In an alternative embodiment, the substrates of the capsule 30 are in mineral material.

Advantageously, the residual stresses induced during the manufacture of the substrates are such that the manufactured substrates do not deform or warp.

Advantageously and optionally, the capsule 30 may be treated by surfacing and polishing and cut by trimming to the form of the finished lens ready for placing on a spectacles frame, prior to the encapsulating step.

The method for encapsulating by bonding an electro optical system comprises also comprises a step of providing an electro active system with a light guide optical element 16.

The encapsulating step S8 comprises the following sub steps:
(a) an adhesive depositing step during which at least one drop of adhesive on a face of the transparent capsule 30 and/or or one of the face of the light guide optical element 16 is deposited;
(b) a positioning step during which the transparent capsule 30 and the light guide optical element 16 are positioned relative to each other;
(c) optionally, a moving step during which the transparent capsule 30 and the light guide optical element 16 are moved relative to each other;
(d) a force application step during which a force is applied to the transparent capsule 30 and/or the light guide optical element 16 to form a layer of adhesive between the face of the transparent capsule 30 and the face of the light guide optical element 16 facing; and
(e) optionally, a releasing step during which the applied force is released.

At the end of step d) or e), during a bonding step f), the light guide optical element 16 and the transparent capsule 30 are made integral with the adhesive.

Advantageously, the encapsulation step S8 of the invention ensures the bonding of the different parts of the capsule 30 and the light guide optical element 16 with an optimum optical quality and homogeneous optical function.

These various steps will be detailed for the bonding of the first substrate 40 forming the first optical face 32 of the capsule 30 and the corresponding major surface 22 of the light guide optical element 16. Of course, such a method is applicable similarly to the eventual bonding of the second substrate 50 forming the second optical face 34 of the capsule 30 and the major surface 20 of the light guide optical element 16 facing.

Referring now to the drawings and in particular to FIGS. 5 and 6, the first substrate 40 is placed on a movable holder (not represented) with its first optical face 32 facing upwardly and the opposite internal face 42 facing a major surface 20 of the light guide optical element 16.

The light guide optical element 16 is also placed on a movable holder (not represented).

During the step a) at least one drop of adhesive is deposited on the internal face of the first substrate 40.

In an embodiment, the drop of adhesive is deposited at the center of the internal face 42 of the first substrate 40.

In an alternative embodiment, several drops of adhesive may be distributed in a matrix on the internal face 42 of the first substrate 40.

The deposition techniques may be any techniques well known to those skilled in the art.

In an alternative embodiment, at least a drop of adhesive is deposited in the major surface 22 of the light guide optical element 16 facing the internal face 42 of the first substrate 40.

In another alternative embodiment, at least a drop of adhesive is deposited in the major surface 22 of the LOE 16 facing a drop of adhesive deposited on the internal face 42 of the first substrate 40, in order to avoid the appearance of bubbles in the adhesive during the first contact of the two drops of adhesive.

The amount of adhesive must be sufficient to form a continuous adhesive film over the entire internal face 42 of the capsule substrate during the application step d) of a force.

The drop of adhesive may be a predetermined dose of curable adhesive material.

The use of a curable adhesive material requires a light radiation providing step and/or heating providing step for obtaining permanent bonding during step d) of force application.

The light radiation is chosen relative to the initiator of the curable adhesive material selected.

During the positioning step b), the light guide optical element 16 and the first substrate 40 supported in the associated holders are positioned relative to each other in order to position the optical center of the first optical surface 32 of the capsule 30 relative to the center of the eye motion box of the light guide optical element 16.

Such a positioning step is applicable similarly to the eventual positioning of the second substrate 50 forming the second optical face 34 of the capsule 30 and the light guide optical element 16 facing.

The relative positioning of the capsule 30 and the light guide optical element 16 may be controlled by any known control method.

In an embodiment, the accurate relative positioning of the capsule 30 and the light guide optical element 16 may be achieved by using positioning references on the capsule substrates 40, 50 and/or the light guide optical element 16.

A movable frame may be used as a positioning reference to position the transparent capsule and the light guide optical element 16 relative to each other.

A camera associated with a target may be used as positioning reference to guide the moving of the transparent capsule and the light guide optical element 16 relative to each other. The analysis of the images of the capsule 30 and the light guide optical element 16 gives the precise position and orientation of each of the capsule 30 and the light guide optical element 16 relative to the camera and relative to the target.

During step c), first substep of the stacking step mentioned above, the first substrate 40 and the light guide optical element 16 are moved relative to each other and at least the drop of adhesive come into contact with the major surface 22 of the light guide optical element 16 facing the internal face 42 of the first substrate 40.

During step d), second substep of the stacking step mentioned above, a force is applied to the first substrate 40 and/or the light guide optical element 16.

The applied force is defined to form a thin continuous film of adhesive between the internal face 42 of the transparent capsule 30 and the major surface 22 of the light guide optical element 16 facing.

The force may be applied in a short period of time, improving the production time of the at least partially encapsulated guide optical element 16 with a transparent capsule 30.

In an embodiment, the force applied on the adhesive and the light guide optical element 16 is defined by the application of the force of gravity due to the weight of the first substrate 40 simply placed on the major surface 22 of the light guide optical element 16.

In another embodiment, the force applied on the adhesive and the first substrate 40 is defined by application of the force of gravity due to the weight of the guide optical element 16 placed on the internal face 42 of the first substrate 40

The inventors have found that the application of the weight of the capsule or the light emitting optical element 16 on the respective corresponding light guide optical element 16 and the substrate is sufficient to obtain an optimal quality of bonding and a high optical quality for the resultant encapsulated electro-optical system.

In another embodiment, the force applied is defined by the application of pressure to the first substrate 40 and/or the light guide optical element 16.

The pressure applied must be uniform and sufficient to recover a light warpage.

Various methods to apply pressure on the first substrate 40 and/or the light guide optical element 16 are used.

In an embodiment, pressure may be applied using a movable deformable pad.

The pad is supported by a supporting element and moved up and down by displacement means.

A sensor may be used to control the pressure applied to the pad during the force application step d).

Depending on whether the first substrate 40 is applied to the light guide optical element 16 or the contrary, the pad is applied respectively to the first optical face 32 of the first substrate 40 or the major surface 20 of the light guide optical element 16 opposite the major surface 22 to be bonded.

During step d), the pad is moved to come into contact with the first optical face 32 of the first substrate 40.

During the application of the pad against the first substrate 40, the pad is deformed and conforms to the curvature of the first optical surface 32 of the capsule.

Additional displacement of the pad pushes down the first substrate 40 towards the facing major surface of the light guide optical element 16 to form a thin continuous layer of adhesive between the internal face 42 of the first substrate 40 and the surface 22 of the light guide optical element 16 facing.

In an embodiment, the pressure is applied in a central portion of the substrate 40.

With respect to the pad, it may be made with silicone material.

In an embodiment, not in use, the face of the pad applied to the first substrate 40 may be plane or may be conformed to the shape of the first optical face 32 of the first substrate 40

In an alternative embodiment, the pad is replaced by a deformable water balloon.

Furthermore, in an alternative embodiment, the pressure may be applied by at least a deformable membrane associated with a vacuum or fluid or solid pressure. Said steps may be carried out by various apparatus known in the art.

During the first alternative embodiment step, the light guide optical element 16 and the capsule 30 are held by their movable holding means in a vacuum chamber.

The vacuum chamber has a side wall which is for example cylindrical with a vertical axis. It is provided with a clamping ring, in order to keep a membrane fixed against the upper peripheral edge of the side wall. The chamber is thus closed off in a sealed manner on its upper face. The chamber is placed above a base at a fixed height.

When the chamber is placed in a vacuum step, the membrane is deformed to conform to the first optical face 32 of the first substrate 40 or the major substrate 22 of the light guide optical element 16 depending whether the first substrate 40 or the light guide optical element is facing the membrane.

The deformation of the membrane pushes down the first substrate 40 towards the facing major surface 22 of the light guide optical element 16 to form a continuous layer of adhesive between the internal face of the first substrate 40 and the face of the light guide optical element 16 facing.

During the releasing step, the vacuum is released and therefore, the light guide optical element 116 and the transparent capsule 30 are made integral with the adhesive.

During the second alternative embodiment step, the vacuum is replaced by a fluid pressure introduced in a cavity in order to inflate the deformable membrane.

The fluid may be a gas or a liquid.

In an alternative, the fluid pressure or the vacuum pressure is replaced by a solid pressure.

The injection of gas in the cavity deforms the membrane and the membrane inflates and pushes down the first substrate 40 towards the facing major surface 22 of the light guide optical element 16 to form a continuous layer of adhesive between the internal face of the first substrate 40 and the face of the light guide optical element 16 facing.

During the releasing step, the gas injection is stopped.

During the bonding step, the light guide optical element 16 and the transparent capsule 30 are made integral with the adhesive.

Furthermore, in an embodiment, the method further comprises a surface treatment providing step during which the faces of the light guide optical element 16 and of the substrates 40, 50 to be bonded may be treated before bonding with an adhesive to improve the bonding.

In an embodiment, the display mounting step S0 during which a display is coupled to the optical insert 16 is implemented prior to the encapsulating step S8 by bonding the capsule 30 and the optical insert 16.

Furthermore, in another embodiment of the method of the invention, the step a) is replaced by the following step:

a1) an adhesive depositing step during which at least a film of adhesive on a face of the transparent capsule 30 and/or or one of the face of the light guide optical element 16 is deposited.

In an alternative embodiment, the step a) is replaced by the following step:

a2) an adhesive depositing step during which at least at least one drop of adhesive on a face of the transparent capsule 30 and/or or one of the face of the optical element (16) is deposited with a spin coating method.

In a third preferred implementation represented on FIGS. 4 and 6, the optical insert 16 (edged or not) is contained within a lens by being placed in a lens blank while it is being molded in a mold comprising a first mold portion 1 for molding the first face, and a second mold portion 2 for molding the second face and a monomer M is casted or injected into this mold, in order to obtain a lens blank 3 which is then, optionally, treated by surfacing and polishing and cut by trimming to the form of the finished lens ready for placing on a spectacles frame.

Advantageously, in the various embodiments, the substrates 40, 50 of the transparent capsule 30 have also a protective function of the optical system and especially the LOE and also can offer a degree of curvature to a flat LOE, in order to improve the aesthetics of the optical head mounting system.

Moreover, the encapsulating step may be implemented to encapsulate at least partially a LOE with either a plane shape or a curved shape.

In an alternative embodiment illustrated in FIG. 6, it will be appreciated that the optical insert 16 could not be encapsulated and forms a blank optical insert (Blank LOE).

Advantageously, the blank optical insert 16 may be treated by surfacing and polishing and cut by trimming to the form of the finished lens ready for placing on a spectacles frame.

During the customizing step S9, in a first embodiment, at least one face of the transparent capsule 30 is customized according to the wearer data.

In this embodiment, it should be noted that the encapsulation may be done temporarily.

During the customizing step S9, in a second embodiment, at least one face of the see-through electro optical element is customized according to the wearer data.

The term "customizing" is used herein to designate any definitive addition of a corrective optical function adapted to the wearer data: it is not possible to remove the corrective optical function without causing damage to either related corrective optical function and see through electro optical system or related corrective optical function and transparent capsule 30.

The term "customizing" used herein excludes corrective clips or temporary, re-usable corrective patches.

For example, the wearer data comprise the wearer prescription. The corrective optical function to be provided to the wearer is determined as for conventional ophthalmic lenses and at least one of the faces of the transparent capsule 30 is customized so as to provide such corrective optical function.

According to an embodiment, the second face 34 of the transparent capsule is to be modified, for example by a manufacturing method, so as to provide the back face 35 of the finished transparent, represented by the dotted line on FIG. 3.

The second face 34 may be modified by machining the surface of said second face 34, using a machining tool or by adding an optical patch having an optical function that adds up with the optical function of the transparent capsule to provide the desired optical function.

While in this embodiment of the invention, the back face of the transparent capsule 30 is customized, it will be understood, that in alternative embodiments of the invention the front face 32 may be customized or both front 32 and back 34 faces may be customized.

Otherwise, in alternative embodiments of the invention, the front and/or back faces of the see-through electro-optical system is customized so as to provide such corrective optical function.

Therefore, according to the invention, a see-through electro-optical system provider may provide generic see-through electro-optical system, i.e. not adapted to the specific need of each individual wearer, and the lens provider may provide non encapsulated generic see-through electro-optical system customized for the specific need of each wearer, as for ophthalmic lenses.

According to an embodiment of the invention, the method may further comprise after the wearer data providing step S2 and prior to the customizing step S9:

a see-through electro optical system data providing step S3,
a capsule data providing step S4,
an optical function determining step S5, and
a surface data determining step S6.

See-through electro optical system data representing at least the shape of the faces of the see-through system prior to the encapsulation step and the optical index of the see-through system is provided during the see-through electro optical system data providing step.

Capsule data representing at least the optical index of the transparent capsule is provided during the capsule data providing step S4.

In a preferred embodiment, capsule data representing the shape of the first and/or the second faces of the capsule is also provided during the capsule data providing step S4.

The shape of the first and second faces is to be understood as at least the surface of the faces and their orientations in a common reference system.

Using the wearer's data and the see-through system's data, the optical function i.e. a diopter correction based on the wearer's prescription to be provided to the wearer is determined. The optical function is determined so as to assure a corrected vision for said wearer when looking through the head mounted electro-optical system. The determination of such optical function can be implemented using the calculating tools that lens designer and/or provider use.

The method according to the invention can thus be applied with prescription glasses, glasses of rest, exercise eye glasses or any other examples.

In an alternative embodiment, the optical function to be provided to the wearer is determined using, also, the capsule data.

Once the optical function is determined, surface data is determined during the surface data determining step S6.

According to a first embodiment of the invention, the surface data represent the surface of at least one face to be customized of the capsule. Said surface data is determined according at least to the optical function and the capsule data.

According to a second embodiment of the invention, the surface data represent the surface of at least one face to be customized of the optical insert 16.

During the surface data determining step S6, it is determined which of the front and/or back face(s) of the transparent capsule or of the optical insert 16 is to be customized.

When the see-through electro-optical system is a display system it may be advantageous to have all the optical function be carried out by the back surface. Indeed, the information displayed by the see-through electro-optical system is seen once encapsulated by the wearer only through the back surface of the transparent capsule. Therefore for the wearer to benefit fully of the ophthalmic correction such ophthalmic correction should be carried by the back surface.

In an alternative embodiment, the surface data determining step is replaced by an index map determining step S6 which index map representing the index variation of at least one face to be customized of the capsule is determined according to the optical function and the capsule data.

In an alternative embodiment, when the customizing step S9 consists in adding a diffractive or holographic optical element on the front and/or back faces of the transparent capsule 30, the surface data determining step is replaced by a diffractive map determining step S6 which diffractive map representing the diffractive variation of at least one face to be customized of the capsule is determined according to the optical function and the capsule data.

As illustrated on FIGS. 1a and 6, the method according to the invention may further comprise a mounting step S10 during which at least a part of the encapsulated see-through electro-optical system is mounted in a spectacle frame 4 (illustrated in FIG. 6). For example, the encapsulated see-through electro-optical system is mounted in a spectacle frame chosen by the wearer.

Figure 1D:
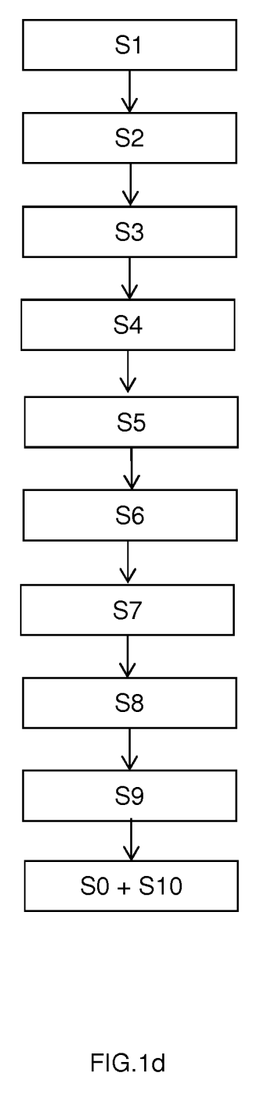
Figure 1E:
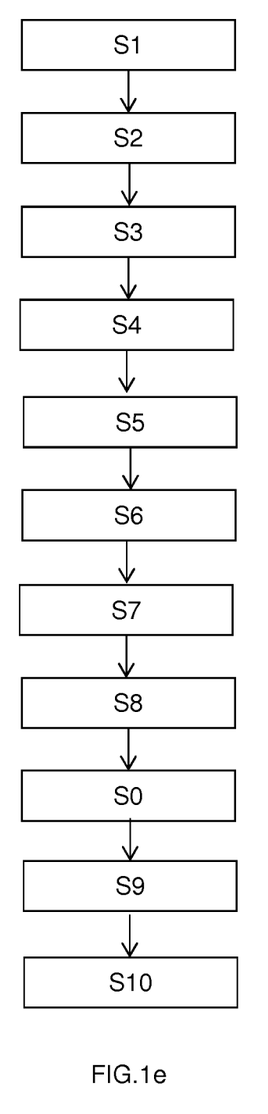
Figure 1F:
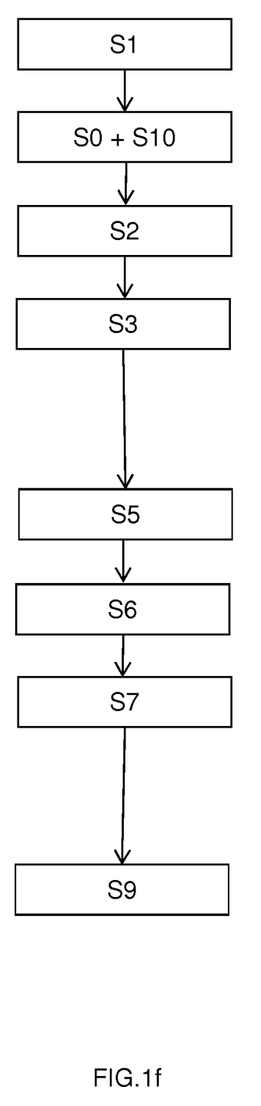

In an alternative embodiment illustrated in FIG. 1f, during the mounting step S10, at least a part of the non-encapsulated see-through electro-optical system is mounted in a spectacle frame 4.

Figure 1G:
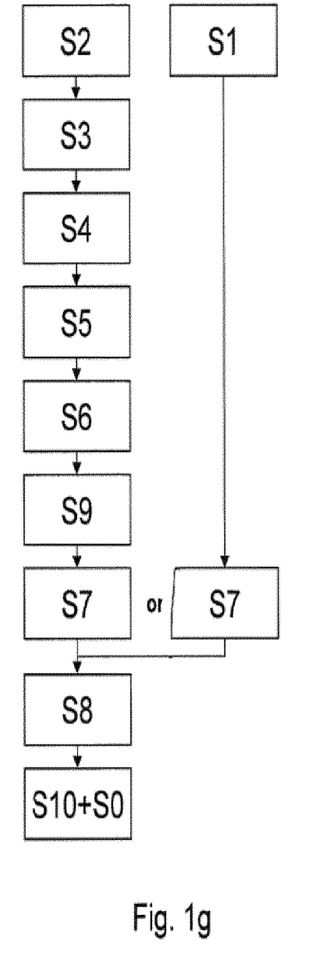

Furthermore, FIGS. 1a to 1g illustrate different flowcharts representing the successive steps of a method according to several embodiments of the invention, In order to simplify the overall process as illustrated in FIGS. 1d, 1e, 1g, the customizing step S9 is implemented prior to the mounting step S10. Such sequence is particularly interesting when the customizing step S9 requires machining one of the surfaces of the transparent capsule 30. Indeed, the machining of one of the surfaces generally requires rotating the transparent capsule 30 and having a machining tool machine one of the surfaces. Such operation can not easily be implemented once the transparent capsule 30 is mounted on a spectacle frame.

When the customizing step S9 consists in adding one of two optical patches on the front and/or back faces of the transparent capsule 30, the customizing step S9 may be implemented after the mounting step S10, as illustrated in FIGS. 1a, 1b, 1c and 1f. Such embodiment allows having the see-through electro-optical system provider provide a standard mounted head mounted system that is subsequently customized, for example by a lens provider or by the wearer himself.

Advantageously, the customization is delayed in the lens production process, thereby simplifying the overall industrial process. Late customization allows for the maximum stage of standards implementation.

Moreover, the embodiment of FIGS. 1a, 1b, 1c and 1f also allows a wide variety of processes.

When the customizing step S9 consists in defining a discrete optical function to the face to be customized of the capsule 30 (or to the face to be customized of the optical insert 16 in the embodiment without encapsulating step), the customizing step S9 may also be implemented after the mounting step S10 with the same advantages.

In an alternative embodiment, defining a discrete optical function to the face to be customized may be implemented prior the mounting step S10.

The addition of the discrete optical function may be implemented by technologies based on the discretization of a blank of the capsule in pixels.

The expression "discrete optical function" may refer in particular to a function provided by a complex pixellated or microstructured structure comprising at least one transparent set of cells juxtaposed parallel to a surface of the component, The cells can be filled with various functional substances chosen for their optical properties, for example associated with their refraction index, their light absorption, their response to electrical or light stimuli, etc.

Such films are in particular able to embody a number of functions within their composition.

The expression "discrete optical function" may also refer in particular to a function provided by incorporating at least an active material having an irradiation modifiable optical property.

Active material is distributed in respective layers superimposed with the capsule or the capsule is made of active material.

The modifiable optical property may comprise a light absorption property and/or the refringence of the active material.

The irradiation of the active material can be carried out by exposing the active material to an appropriate beam through a mask or by using a laser.

The expression "discrete optical function" may also refer in particular to a function provided by incorporating additive components distributed in respective layers superimposed with the capsule or within the capsule or by defining a Fresnel surface.

Figure 1H:
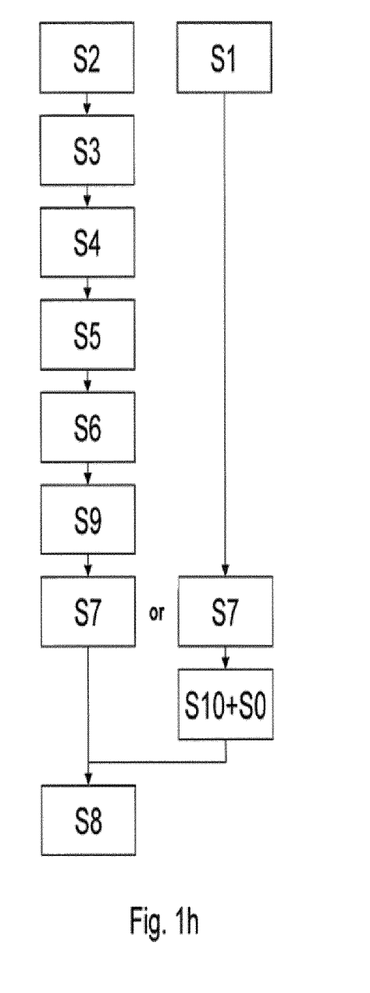
Figure 1I:
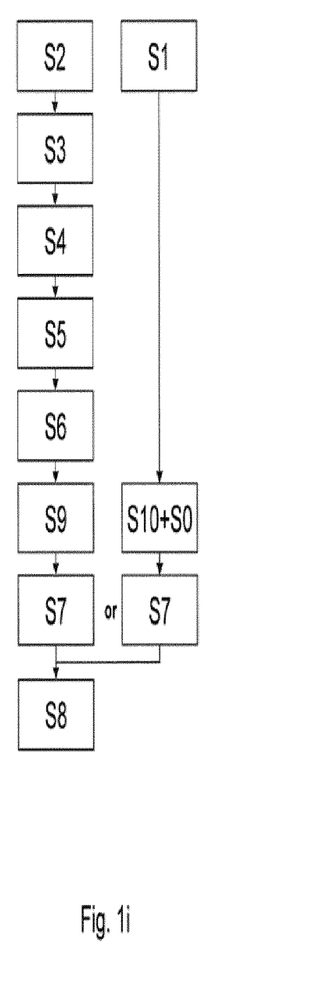

According to an embodiment illustrated in FIGS. 1g, 1h and 1i, the customizing step S9 of the capsule 30 is implemented prior to the encapsulating step S8. Such sequence is particularly interesting when the customizing step requires machining one of the surfaces of the transparent capsule. Indeed, such sequence reduces the risk of damaging the see-through electro-optical system during the machining of one of the surfaces.

Such embodiment, as embodiment illustrated in FIGS. 1g, 1h and 1i, are particularly advantageous: Such sequence allows to decorrelate work on the capsule of the entire process. The optical part of the process is uncorrelated to the electronic part of the process. The latter is facilitated and the quality of the head mounted system is improved.

According to an embodiment of the invention, the customizing step S9 may comprise machining one or both of the faces of the transparent capsule and adding an optical patch or a discrete optical function on at least one of the machined faces, or on both of the machined optical faces.

According to such embodiment, the machining part of the customizing step S9 is carried out prior to the encapsulating S8 and mounting S10 steps whereas the patch part or the discrete optical function part may be carried out after the mounting step S10.

In an alternative, the machining part and the patch part or the discrete optical function part may be carried out after the mounting step S10.

Moreover, when the customizing step S9 consists in adding one of two optical patches on the front and/or back faces of the transparent capsule 30, the edging step may be optional.

When the method further comprises a display mounting step S0, the display mounting step may be implemented prior to the encapsulating step S8. Such operation S0 can easily be implemented when the optical insert 16 is inserted laterally in the slot 36 of the transparent capsule 30.

Furthermore, such operation S0 can be easily implemented concurrently with a customizing step S9 of the transparent capsule 30 made prior to the encapsulating step S8 as illustrated in particular in FIGS. 1h and 1i.

Advantageously, the display step S0 can be performed without disturbing customizing step S9 and the encapsulating step S8 since the steps are decoupled.

Furthermore, such operation S0 can be easily implemented at the same time with mounting step S10 or before the latter S10, as illustrated in FIGS. 1a, 1b, 1d, 1f, 1g, 1h and 1i.

According to the embodiment of FIG. 1d, 1a and, 1g, the display mounting step S0 is delayed in the progress of the production process. Advantageously, customization may be facilitated and the head mounted system quality is improved because the display is not embarrassing at the time of the encapsulating step and/or of the customizing step.

The method according to the invention may further comprise an insulating step S7, during which the see-through electro optical system and/or the capsule 30 is at least partly insulated.

The insulation step S7 comprises:
- an insulation function determining step, during which the insulation function according to the see-through system data is determined, and
- an insulation data determining step, during which insulation data representing at least the optical index(es) of at least one face to be insulated of the see-through system or the capsule 30 is determined according to the insulation function and the see-through system data.

Advantageously, the insulation data represents the reflectance data, transmission data, optical index(es) and polarization data of at least one face to be insulated of the see-through system or the capsule 30 is determined according to the insulation function and the see-through system data.

According to this embodiment, the see-through system data also include at least the optical index(es) of the see-through electro optical system.

Advantageously, the see-through system data represents the reflectance data, transmission data, optical index(es) and polarization data of the see-through electro optical system.

According to an embodiment, the insulation step S7 is implemented prior to the encapsulation step S8.

According to another embodiment, the capsule insulation step S7 is implemented after the encapsulation step S8.

According to an embodiment, the capsule insulation step S7 is implemented after the customizing step S9 as illustrated in FIG. 1g.

According to an embodiment, the capsule insulation step S7 is implemented after the mounting step S10 as illustrated in FIG. 1i.

During the insulation step S7, the face of the capsule 30 or the face of the see through electro optical system is subjected to isolator treatment to ensure a high degree of reflection of said face.

The insulation may be implemented by means of a hologram operating in reflection, or by means of coating technologies or any known insulation technology.

While the foregoing examples have been described with reference to an electro optical system, it will be appreciated that the method of the invention may be applied to optical system with a switchable function (active function) that enables at least part of the active function of the system to be controlled by means of stimulus other than electrical ones such as manual or radiation stimuli.

Therefore, the active function may include at least one or more active functions selected from the group consisting of:
- a display information function;
- an electrochromic function;
- an photochromic function;
- a polarizing function;
- an anti-fog function;
- a tinted function.

Such several active functions may improve optical or mechanical properties of the head mounted optical system.

With respect to a see through display optical system, several active functions such as the active functions listed above may be added to the display function.

More particularly, when the optical insert 16 is partly encapsulated in the transparent capsule 30 on one of his face or fully encapsulated in the transparent capsule 30, several active functions listed above may be added to at least one face of the optical insert 16 and/or one face of the transparent capsule 30 such as one or both the major surfaces 20, 22 of the optical insert 16 and/or the first optical face 32 and/or a second optical face 34 of the transparent capsule 30.

In that way, with respect to the electrochromic function, an electrochromic function may be provided on one surface of the optical insert 16 or to a face of the of the transparent capsule 30 such as the first optical face 32 and/or the second optical face 34

In non limitative examples, the electrochromic function may be provided by an electrochromic layer as described herewith below, or by a complex structure comprising at least one transparent set of cells juxtaposed parallel to a surface of the component filled with various functional substances chosen for their optical properties associated with, their response to electrical stimuli, etc, or by a polymer material gel or polymer material liquid known from the State of Art.

Besides, with respect to the photochromic function, photochromic materials are capable of switching between a clear state to a state where they are colored. The materials change states based, on the amount and wavelength of radiation they encounter.

In non limitative examples, the photochromic function is provided by incorporating photochromic dyes into the capsule 30 material and/or the insert 16 material, as long as the material is addressed to receive UV light, into an insert or a capsule photochromic layer coating.

In another example disclosed in WO2013006153, the photochromic function is provided by a temporary photochromic film (or patch) that could be easily applied to and conform to the shape and curvature of the first optical face 32 of the transparent capsule 30.

In an embodiment, the temporary photochromic film may be applied to the concave face if the material is not a UV cut filter material.

Moreover, in an embodiment, the method of the invention may further comprise:
- a functional layer providing step during which at least a functional layer is provided and
- a functional layer coating step during which the functional layer is coated to a face of the optical system and/or the transparent capsule.

The functional layer may include one or more layers selected from the group consisting of: a polarizing layer, a photochromic layer, an electrochromic layer, a hard coat layer (abrasion and/or scratch-resistant coating and/or an impact-resistant coating), a top coat layer, an anti-fog layer, an anti-smudge layer, an anti reflective layer, an interferential layer, an anti-static layer and a tinted layer.

Such layers may improve optical or mechanical properties of the head mounted optical system.

When the optical insert 16 is partly encapsulated in the transparent capsule 30 on one of its faces or fully encapsulated in the transparent capsule 30, several functional layers listed above may be coated to at least one face of the optical insert 16 and/or one face of the transparent capsule 30 such as one or both of the major surfaces 20, 22 of the optical insert 16 and/or the first optical face 32 and/or a second optical face 34 of the transparent capsule 30.

The coating step may include any known solutions to fix the functional layer to the transparent capsule and/or the optical system.

For example, the functional layer is coat with a dip-coating method, a spin-coating method, a vacuum deposition method, a spray-coating method, a film transfer method, a film lamination method or an imbibition process.

In particular, a functional layer may be glued to a face of the transparent capsule 30 and/or the optical system such as the major surfaces of the insert 16 by a latex glue, a UV curable glue, a HMA (Hot Melt Adhesive) glue, a pressure sensitive adhesive (PSA), or bi-layer adhesive structure disclosed in US 2010/0110567. Such bi layer adhesive structure includes a layer of latex adhesive disposed on a surface of the functional layer and a layer of hot melt adhesive disposed between the latex layer and the capsule 30 or the surface of the optical system such as the surface of the insert 16, to form a bi-layer adhesive.

This embodiment is particularly well adapted to coat a functional layer with a transfer method and more particularly a film lamination method disclosed in EP 1866144 wherein at least one functional layer as mentioned hereinbefore is coated to a flat film, like a thermoplastic film based on polycarbonate, polyethyleneterephtalate, polyurethane, cyloolefine, or cellulose triacetate.

While the foregoing examples have been described with reference to a see through electro optical system, it will be appreciated that the method of the invention may be applied to non immersive or immersive electro-optical system such as head mounted display system with see-around mechanism.

While the foregoing examples have been described with reference to the manufacture of an ophthalmic lens, it will be appreciated that the method of the invention may be applied more generally to the manufacture of other types of optical lens, for example optical lens used in telescopes and the like.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for providing a head mounted optical system adapted to a wearer, the method comprising:
   an optical system providing step, during which an optical system is provided, the optical system being an electro-optical system with a switchable function that enables at least part of an active function of the system to be controlled by means of an electrical stimulus;
   a wearer data providing step, during which wearer data comprising at least the wearer's prescription is provided;
   an encapsulating step, during which the optical system is at least partly encapsulated in a transparent capsule;
   an optical system data providing step, during which optical system data representing at least a shape of faces of the optical system prior to the encapsulation step and an optical index of the optical system is provided;
   a capsule data providing step, during which capsule data representing at least an optical index of the transparent capsule and a shape of at least one of a first face and a second face of the capsule is provided;
   an optical function determining step, during which an optical function to be provided to the wearer is determined according to the wearer data and the system data;
   a surface data determining step, during which surface data representing the surface of at least one face to be customized of the capsule is determined according to the optical function and the capsule data; and
   a customizing step, during which at least one face of the transparent capsule is customized according to the surface data;
   wherein the optical system is at least partly encapsulated in a transparent capsule by stacking in close contact the optical system with at least one substrate of the transparent capsule and made integral with an adhesive.

2. The method according to claim 1, wherein the method further comprises a mounting step, during which the encapsulated optical system or the optical system is mounted in a spectacle frame.

3. The method according to claim 2, wherein the customizing step is implemented prior to the mounting step.

4. The method according to claim 1, wherein the customizing step is implemented after the mounting step.

5. The method according to claim 1, wherein the customizing step is implemented prior to the encapsulating step.

6. The method according to claim 1, wherein the customizing step is implemented after the encapsulating step.

7. The method according to claim 1, wherein the method further comprises:
   an index map determining step which an index map representing the index variation of at least one face to be customized of the capsule is determined according to the optical function and the capsule data.

8. The method according to claim 1, wherein the method further comprises:
   a diffractive network map determining step which a diffractive network map representing the diffractive variation of at least one face to be customized of the capsule is determined according to the optical function and the capsule data.

9. The method according to claim 1, wherein during the optical function determining step, the optical function to be provided to the wearer is determined according to the wearer's data, the optical system's data and the capsule's data.

10. The method according to claim 1, wherein during the customizing step the face to be customized of the capsule is machined according to the surface data.

11. The method according to claim 1, wherein during the customizing step an optical patch is added to the face to be customized of the capsule or of the optical system.

12. The method according to claim 1, wherein during the customizing step a discrete optical function is added to the face to be customized of the capsule or of the optical system.

13. The method according to claim 1, wherein the head mounted optical system is a head mounted see-through display system.

14. The method according to claim 13, wherein the method further comprises a display mounting step during which a display is coupled to an optical insert, wherein the display mounting step is implemented prior to the encapsulating step.

15. The method according to claim 1, wherein during the encapsulating step an optical insert is placed in a slot of the capsule by being inserted laterally in the slot.

16. The method according to claim 1, wherein the optical system has at least one active function which includes one or more active functions selected from the group consisting of:
- an electrochromic function;
- an photochromic function:
- a polarizing function;
- an anti-fog function;
- a tinted function; and
- a display function.

17. The method according to claim 1 further comprising:
- a functional layer providing step during which at least a functional layer is fixed to a face of the optical system and/or the transparent capsule, the functional layer being selected from the group consisting of: a polarizing layer, a polarizing layer, a photochromic layer, an electrochromic layer, a hard coat layer, a top coat layer, an anti-fog layer, an anti-smudge layer, an anti-reflective layer, an interferential layer, an anti-static layer, and a tinted layer; and
- a functional layer coating step during which the functional layer is coated to at least one face of the optical system and/or the transparent capsule.

18. The method according to claim 1, wherein the encapsulating step comprises the following sub steps:
- an adhesive depositing step during which at least one drop of adhesive on a face of the transparent capsule and/or or one of the face of the optical element is deposited;
- a force application step during which a force is applied to the transparent capsule and/or the optical element to form a layer of adhesive between the face of the transparent capsule and the face of the optical element facing; and
- a bonding step during which the optical element and the transparent capsule are made integral with the adhesive.

19. The method according to claim 18, wherein the force applied is defined by the application of the weight force of the transparent capsule or the optical element respectively on the optical element or the transparent capsule.

20. The method according to claim 18, wherein the force applied is defined by the application of a pressure on the optical element and/or the transparent capsule.

21. The method according to claim 20, wherein the pressure is applied using:
- at least a movable deformable pad, or
- at least a deformable membrane with fluid or solid or vacuum pressure.

22. The method according to claim 1, wherein the encapsulating step comprises the following sub steps:
- an adhesive depositing step during which at least a film of adhesive on a face of the transparent capsule and/or or one of the face of the optical element is deposited;
- a force application step during which a force is applied to the transparent capsule and/or the optical element to form a layer of adhesive between the face of the transparent capsule and the face of the optical element facing; and
- a bonding step during which the optical element and the transparent capsule are made integral with the adhesive.

23. The method according to claim 1, wherein the encapsulating step comprises the following sub steps:
- an adhesive depositing step during which at least at least one drop of adhesive on a face of the transparent capsule and/or or one of the face of the optical element is deposited with a spin coating method;
- a force application step during which a force is applied to the transparent capsule and/or the optical element to form a layer of adhesive between the face of the transparent capsule and the face of the optical element facing; and
- a bonding step during which the optical element and the transparent capsule are made integral with the adhesive.

* * * * *